Patented Dec. 15, 1925.

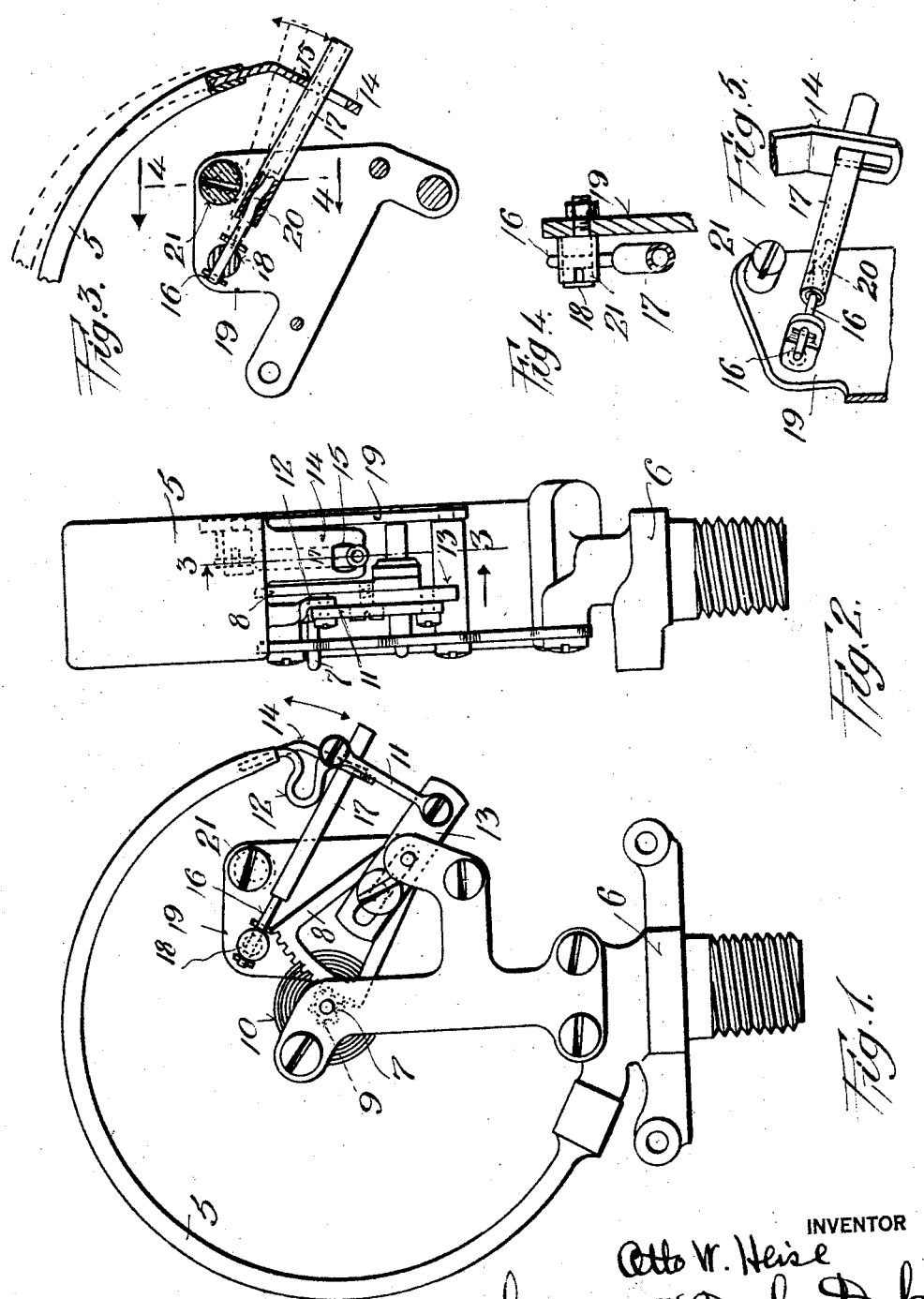

1,565,446

UNITED STATES PATENT OFFICE.

OTTO W. HEISE, OF BRIDGEPORT, CONNECTICUT, ASSIGNOR TO MANNING, MAXWELL & MOORE, INC., OF NEW YORK, N. Y., A CORPORATION OF NEW JERSEY.

RETARD GAUGE.

Application filed June 11, 1921. Serial No. 476,687.

*To all whom it may concern:*

Be it known that I, OTTO W. HEISE, a citizen of the United States, residing at Bridgeport, county of Fairfield, State of Connecticut, have made a certain new and useful Invention in Retard Gauges, of which the following is a specification.

This invention relates to gauges, and particularly to gauges of the retard type.

One object of the invention is to simplify the structures of gauges of the retard type without sacrificing anything of effectiveness in the use and operation thereof.

A further object is to provide a retard gauge structure which is economical to manufacture, and which can be readily, easily and quickly assembled, and adjusted to meet the requirements of use.

A further object is to provide means which are exceedingly simple, for adjusting the tension of the retarding action.

Other objects of the invention will appear more fully hereinafter.

The invention consists substantially in the construction, combination, location and relative arrangement of parts, all as will be more fully hereinafter set forth, as shown in the accompanying drawing, and finally set forth in the appended claims.

Referring to the accompanying drawings:

Figure 1 is a view in front elevation of a Bourdon tube actuated gauge movement illustrating the application thereto of a retard mechanism embodying the principles of my invention.

Fig. 2 is an edge view of the structure shown in Fig. 1.

Fig. 3 is a fragmentary detail view, partly in section, on the line 3—3, of Fig. 2, illustrating the arrangement and operation of the auxiliary or retard elements embodying my invention.

Fig. 4 is a fragmentary detail view, in section, on the line 4—4 of Fig. 3, looking in the direction of the arrows.

Fig. 5 is a view similar to Fig. 4, illustrating a slightly modified mounting for the retard spring element.

The same part is designated by the same reference numeral wherever it occurs throughout the several views.

In the use of pressure indicating gauges the demands of modern practice require a gauge structure wherein an auxiliary yielding resistance or retarding action is imposed on the pressure responsive element of the gauge in case said element is subjected to a sudden abnormal pressure or to a pressure which exceeds a certain predetermined degree. The action of such abnormal or excessive pressure tends to cause a more or less permanent "set" or deflection of the sensitive element, thereby producing inaccuracy in the normal gauge readings, and hence impairing the efficiency of the instrument. Gauges in which provision is made for avoiding or overcoming defects resulting from this cause are now called in the art, retard or retard spring gauges, and in their more essential features they include means to apply an auxiliary spring tension to resist the action of the pressure-responsive element of the gauge when an excessive or an abnormal pressure is imposed on such pressure-responsive element. In retard gauge structures of this nature it is desirable to secure the greatest simplicity and economy of structure, as well as ease and facility in the assembly of the parts and in effecting adjustment of the tension of the retarding element, and of the point at which the retarding action is imposed upon the pressure-responsive element of the gauge. It is among the special purposes of my present invention to secure these and other desirable results in a structure which is exceedingly simple and inexpensive.

In one illustrative application of my invention, I have shown a gauge of the Bourdon type wherein the Bourdon tube 5 is connected at one end to a socket 6, designed, in the usual manner, to be connected to a source of pressure to be indicated. It is to be understood, of course, that my invention is not to be restricted or limited in the application thereof to gauges of the Bourdon tube type.

The gauge movement, likewise, may be of any well known type or structure. An illustrative arrangement is shown wherein the spindle 7 which carries the dial hand or pointer is mounted in a suitable framework, and is relatively actuated by means of a gear segment 8, engaging a pinion 9 on the dial hand spindle. The usual retracting or hair spring 10 resists the rotational displacement of the dial hand spindle from an initial or "zero" position of the dial hand, Any suitable connections may be employed intermediate the gear segment 8 and the pressure-responsive element—in this instance the Bourdon tube—and for this purpose I have shown a link 11 pivotally connected at one end to the tip 12, at the free end of the Bourdon tube, and at the other end to an adjustable slide member 13 of the gear segment.

The parts, as far as described in the details thereof, form no part of my present invention, and may be of the usual or any well known type or structure.

A supporting pin or bracket 18 is swiveled upon a portion 19 of the frame of the gauge mechanism to turn freely about a substantially horizontal axis. One end of an elongate spring 16 is fixedly secured to the post or bracket 18. The free end of the spring 16 is provided with a substantially rigid extension member 17. This extension member preferably consists of a tube which telescopes over the free end of the spring and which may be adjusted longitudinally of the latter. In order to retain the sleeve or extension member 17 in adjusted position, the end portion of the spring is preferably provided with a hump 20 which insures intimate frictional engagement between the parts, while permitting the desired adjustment to be made by exerting sufficient force upon the tubular extension 17. It is contemplated that other modes of adjusting the tubular extension relatively to the spring may be employed if desired.

The free end of the extension 17 is disposed within an elongate substantially vertical slot 15 in a bracket member 14 carried by the end of the pressure responsive element, in this case the Bourdon tube. Normally the weight of the extension 17 and of the spring 16 causes the extension to rest upon the lower edge of the slot 15 in the bracket, so that as the Bourdon tube moves under variation in pressure, the extension and the spring turn freely about the axis of the post or bracket 18. The weight of the extension and spring thus forms a uniform addition to the resilient resistance of the Bourdon tube and thus does not substantially affect the normal operation of the latter.

An adjustable abutment 21 is also mounted upon the support 19 in such a position that when the Bourdon tube has arrived at the limit of its normal movement, the extension member 17 will come into engagement with the abutment. The pressure at which such engagement takes place may be adjustably determined by changing the position of the abutment 21. The adjustment of this part 21 is conveniently provided by making it in the form of an eccentric stud having a slot in its head for the reception of a screw driver. This stud turns with sufficient friction in its bearings to retain it in its adjusted position.

When the pressure in the Bourdon tube becomes abnormal so as to tend to move the tube and the gauge mechanism beyond its normal range, the extension 17 comes into engagement with the stud 21. Thereafter the rigid extension 17 acts as a lever whose short arm is secured to the spring 16 and whose long arm is actuated by the bracket 14. When force is applied to the outer end of the extension 17, as by abnormal pressure in the Bourdon tube, the extension fulcrums about the abutment 21 but its turning is opposed by the spring 16. The resistance of the spring 16 is thus indirectly applied to the Bourdon tube so that the action of the latter and of the gauge movement is very much retarded. By adjusting the extension 17 longitudinally of the spring 16, the relative lengths of the short and long arms of the extension acting as a lever are changed, while at the same time the length of the effective portion of the spring 16 is changed, thereby varying its resistance to flexing.

By the employment of the mechanism described, it is thus possible not only to vary the pressure at which the retard action shall take place, but also to vary the degree of opposition to movement of the Bourdon tube.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having now set forth the objects and nature of my invention and a construction embodying the principles thereof, what I claim as new and useful, and of my own invention, and desire to secure by Letters Patent is:

1. A gauge mechanism having a Bourdon tube and means for modifying its action comprising a lever, a fulcrum therefor disposed intermediate the ends of the lever, means connecting one end of the lever to the Bourdon tube, said means being constructed to allow unrestrained freedom of movement to the Bourdon tube through a predetermined range, means opposing resilient resistance to movement of the other end of the lever, a movable index, means tending to retain the index at one limit of its path of movement, and means for transmitting movement of the lever to the index.

2. A gauge mechanism having a pressure responsive element and means for modifying its action comprising a fulcrum, a lever movable relatively to the fulcrum to vary the relative lengths of its lever arms, lost motion connections between one arm of the lever and the pressure responsive element, and means opposing resilient resistance to movement of the other arm of the lever, the parts being so constructed and arranged that shifting of the lever varies the resistance of said resilient element.

3. A gauge mechanism having a Bourdon tube and means for modifying the action thereof comprising an elongate spring supported at one end, a lever having one arm thereof secured to the free end of the spring, a fulcrum for the lever, and means operative after a predetermined movement of the free end of the Bourdon tube when subjected to pressure to transmit further movement of such free end of the tube to the other end of the lever.

4. A gauge mechanism having a Bourdon tube and means for modifying the movement of the tube comprising an elongate rigid member supported resiliently at one end, an abutment engageable with said rigid member intermediate its ends, and a part carried by the Bourdon tube and having an elongate slot for the reception of said rigid member whereby to provide lost motion connections between the latter and the tube.

5. A gauge mechanism having a Bourdon tube and means for modifying its action comprising an elongate spring pivotally supported at one end, a rigid sleeve sheathing the free extremity of the spring and longitudinally adjustable relatively thereto, an abutment disposed for engagement by said sleeve when the latter is moved in one direction, and a member connecting said sleeve with the Bourdon tube.

6. A gauge mechanism having a Bourdon tube and means for modifying its action comprising an elongate spring pivotally supported at one end, a sleeve sheathing the free end of the spring and slidable longitudinally of the latter, an abutment member engageable with the sleeve, and means connecting the sleeve with the Bourdon tube.

7. A gauge mechanism having a Bourdon tube and means for modifying the action of the tube comprising an elongate rigid member resiliently supported at one end, an adjustable abutment engaging the rigid member intermediate its ends, and a member secured to the Bourdon tube and having an opening for the passage of the other end of the rigid member.

8. A gauge mechanism having a Bourdon tube and means for modifying the action thereof comprising an elongate spring pivotally supported at one end, a rigid member adjustably connected to the free end of the spring, a normally fixed abutment engageable by said member and a member carried by the Bourdon-tube provided with an elongate slot for the reception of said rigid member.

9. A gauge mechanism having a Bourdon tube and means for modifying its action comprising a tubular lever, a movable fulcrum therefor, a member connected to the Bourdon tube and having an elongate opening through which one arm of the lever projects, an elongate spring having one end sheathed in the other arm of the lever, and means pivotally supporting the other end of the spring.

10. A gauge mechanism having a Bourdon tube and means for modifying its action comprising a spring mounted upon a swivelling support, a substantially rigid arm secured to the spring and movable with the latter, a member carried by the Bourdon tube having an opening for the reception of said arm, and means engageable by the arm when moved by the Bourdon tube to limit its free movement about the axis of the swivel support of the spring.

11. A gauge mechanism having a Bourdon tube and means for modifying its action comprising an elongate spring having one end secured to a support pivoted to turn about a substantially horizontal axis and an extension secured to its opposite end, a member carried by the Bourdon tube having an element engageable with the extension of the free end of the spring whereby the spring is swung freely during normal movements of the Bourdon tube, and an abutment engageable with the extension of the spring whereby to limit free swinging of the latter upon abnormal movement of the Bourdon tube.

12. A gauge mechanism having a pressure responsive element, an elongate spring having one end mounted in a support pivoted to swing about a substantially horizontal axis, a substantially rigid elongate extension member adjustably secured to the free end of the spring, a bracket carried by the pressure responsive element having an elongate slot upon whose lower edge the end of the extension member rests, and an adjustable abutment arranged to engage the extension member intermediate its ends to limit the free movement of said extension member with the pressure responsive element.

In testimony whereof I have hereunto set my hand on this 31st day of May A. D. 1921.

OTTO W. HEISE.